US010271682B2

(12) United States Patent
Engels et al.

(10) Patent No.: US 10,271,682 B2
(45) Date of Patent: Apr. 30, 2019

(54) SYSTEM FOR PREPARING A DRINK AND METHOD FOR USE OF THE SYSTEM

(71) Applicant: AT Venture B.V., Beverwijk (NL)

(72) Inventors: Kaspar Alphons Max Engels, Beverwijk (NL); Anton Harold Kuiper, Beverwijk (NL); Nicolaas Leonardus Braun, Beverwijk (NL); Cornelis Petrus Nicolaas Groen, Beverwijk (NL)

(73) Assignee: AT VENTURE B.V., Beverwuk (NL)

( * ) Notice: Subject to any disclaimer, the term of this patent is extended or adjusted under 35 U.S.C. 154(b) by 496 days.

(21) Appl. No.: 14/831,354

(22) Filed: Aug. 20, 2015

(65) Prior Publication Data

US 2015/0351584 A1    Dec. 10, 2015

Related U.S. Application Data

(63) Continuation of application No. PCT/NL2014/050104, filed on Feb. 20, 2014.

(30) Foreign Application Priority Data

Feb. 20, 2013 (NL) .................................... 2010335
Dec. 9, 2013 (NL) .................................... 2011917

(51) Int. Cl.
*A47J 31/06* (2006.01)
*A47J 31/44* (2006.01)
*A47J 31/46* (2006.01)

(52) U.S. Cl.
CPC ......... *A47J 31/467* (2013.01); *A47J 31/0652* (2013.01); *A47J 31/4403* (2013.01)

(58) Field of Classification Search
CPC ........ A47J 31/44; A47J 31/10; A47J 31/0652; A47J 31/4403; A47J 31/467
(Continued)

(56) References Cited

U.S. PATENT DOCUMENTS 5,803,320 A * 9/1998 Cutting ................ B67D 1/0036
222/129.1
2006/0034987 A1* 2/2006 Thakur ................... A23F 5/405
426/477
(Continued)

FOREIGN PATENT DOCUMENTS

| GB | 2452981 | 3/2009 |
|---|---|---|
| WO | 2005/011452 | 2/2005 |
| WO | 2014/129897 | 8/2014 |

*Primary Examiner* — Dana Ross
*Assistant Examiner* — Joseph W Iskra
(74) *Attorney, Agent, or Firm* — Peacock Law P.C.; Janeen Vilven

(57) ABSTRACT

A system for preparing a drink by mixing a drink extract with water, wherein the system comprises an extract container for holding a predefined amount of drink extract and a mixing device, wherein the extract container is an independent unit, closed from all sides and the mixing device comprises a water transport pipe that at one end is connectable to a water feed, and a hollow space that is arranged for receiving the extract container, wherein the hollow space at a bottom side is fluidly connected with the water transport pipe; wherein the water transport pipe at a location of the connection with the hollow space comprises a constriction for creation during operation of an underpressure at that location.

13 Claims, 1 Drawing Sheet

(58) Field of Classification Search
USPC .............. 99/275, 279, 291, 295, 304, 306; 426/477
See application file for complete search history.

(56) References Cited

U.S. PATENT DOCUMENTS

| | | | |
|---|---|---|---|
| 2006/0196362 A1* | 9/2006 | Mariller | A47J 31/0652 99/279 |
| 2010/0154647 A1 | 6/2010 | Skalski et al. | |
| 2010/0251899 A1* | 10/2010 | Lin | A47J 31/0652 99/284 |
| 2010/0258009 A1 | 10/2010 | Lin | |

\* cited by examiner

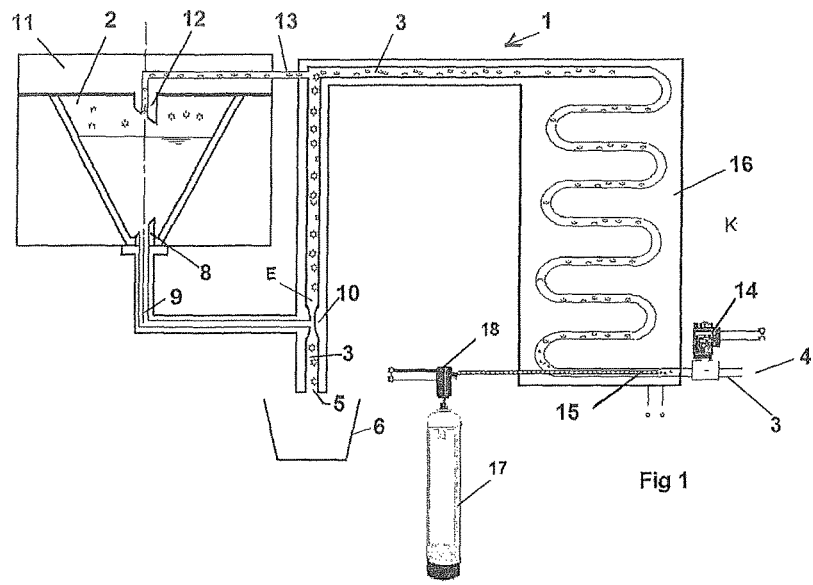
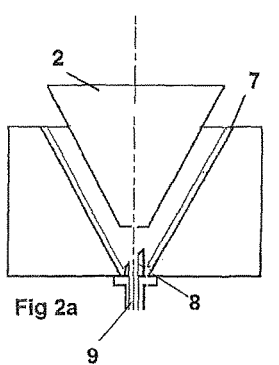
Fig 2a
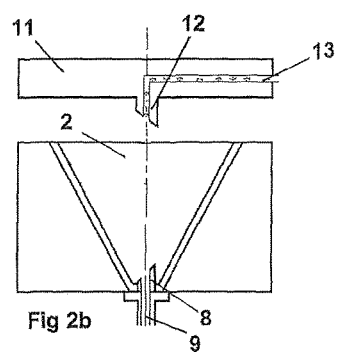
Fig 2b
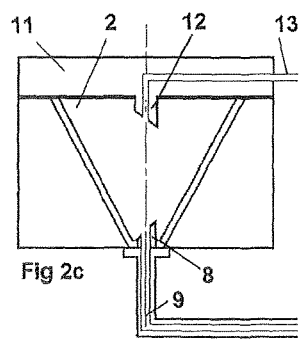
Fig 2c

SYSTEM FOR PREPARING A DRINK AND METHOD FOR USE OF THE SYSTEM

CROSS-REFERENCE TO RELATED APPLICATIONS

This application is a continuation application of Patent Cooperation Treaty Application No. PCT/NL2014/050104, filed on Feb. 20, 2014, which claims priority to Netherlands Patent Application Nos. 2010335 and 2011917, filed on Feb. 20, 2013 and Dec. 9, 2013, respectively, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention relates to a system for preparing a drink by mixing a drink extract with water, wherein the system comprises an extract container for holding a predefined amount of drink extract and a mixing device. The invention also relates to a method for preparing a drink using this system.

Description of Related Art

Systems are known for preparation of drinks from extract and water or soda water wherein extract of a certain type of chosen drink can be mixed in a certain amount with a certain amount of water which may or may not contain carbon dioxide. It should be noted here that when in this document the word extract is being used, this is supposed to comprise also concentrates. Such devices are suited for preparing units of a limited amount of certain different drinks. Often it concerns automatic machines for three or four different types of soft drinks. For each type of drink to be prepared such automatic machines comprise a container with the extract of the drink concerned. These known devices exhibit the following disadvantages. They have been primarily arranged for professional use in which large quantities of a limited assortment are being offered. Such devices are not well suited for home use. In the first place because the variety of drinks is rather limited. In addition such devices require a considerable amount of space and they are rather costly.

There is a need for a system for preparing a drink with which alternatingly a large assortment of drinks of different kinds can be prepared in small amounts, essentially single consumptions, without the system requiring a lot of space. In addition it is required that the system can be manufactured at an acceptable cost for consumers.

BRIEF SUMMARY OF THE INVENTION

A system that fulfils the requirements mentioned above is a system according to claim 1. Such a system comprises an extract container with a predefined amount of drink extract as well as a mixing device for mixing the drink extract with water. The extract container is embodied as an independent unit that fully encloses its content. Because the system does function with a separate extract container, the system is suitable to prepare small amounts, for instance units of a glass or cup, of drinks of different kinds. When a glass of a certain kind of drink is being desired, it is sufficient to use a container with the desired type of drink extract in the mixing device. Because the containers comprise relatively small amounts of drink extract, the size of the containers can be kept small, so that storage of a reasonable amount of extract containers may require a limited amount of space, and where in addition different extract containers with respect to the content can be chosen for a large variety of drink. Because the extract containers are fully enclosed units, they can be stored for long time without loss of quality and in addition in most cases the storage place does not have to be cooled so that no costly space in refrigerators needs to be occupied. In addition the mixing device is rather simple in construction. This comprises a water transport pipe and a hollow space for receiving an extract container. The water transport pipe is at one end connectable to a water feed and at the other end it comprises a discharge opening. The water feed can be formed by a water reservoir of suitable dimensions that belongs to the mixing device but is detachable therefrom. It is also possible that the water feed is comprised by a connection to a system of drinking water supply. The latter is particular advantageous when the system is being used for a consecutive preparation of large quantities of drinks of possible different kinds, such as may happen at parties. Also a combination is possible so that in normal cases the water reservoir is being used and at special occasions the mixing device is connected directly to a water tap. The water reservoir can be incorporated in the water transport pipe. The water transport pipe comprises a constriction wherein at the location of the constriction there is one end of a connecting pipe that in its other end ends in the hollow space that may receive an extract container. By placing the extract container in the hollow space this container is being opened at the bottom by a first opener that is incorporated in the mixing device. This causes that the extract may flow from the extract container to the water transport pipe at the location of the constriction. When water is flowing from the water feed through the water transport pipe to the discharge opening, at the location of the constriction as a consequence of a Venturi-effect a local underpressure is being created. This underpressure will cause the extract to be sucked out of the extract container to the water transport pipe, where it mixes with the water flowing through the water transport pipe before the mixture will be discharged from the discharge opening. In this way in a very simple manner a mechanism has been created to suck the drink extract from the extract container and mix this with the water that is being fed. Thus the construction of such a mixing device can be kept very simple so that the system can be manufactured at cost that can be interesting for the consumer market.

The system according to the invention becomes even more effective when the mixing device comprises a second opener that can open the extract container from the top side when the extract container is inserted in the hollow space, wherein the second opener is coupled to a branch pipe for establishing a fluid connection between the water transport pipe at a position upstream of the constriction and the opened top side of the extract container. When the water flows through the water transport pipe then also water will flow through the branch pipe to the extract container and thus will push the drink extract from the top of the extract container, via the connection pipe to the water transport pipe at the location of the constriction. Thus the operation of emptying the extract container by the underpressure at the constriction in the water transport pipe is being supported by water that flows from the branch pipe in the top of the extract container. This water will exhibit a higher pressure as compared to pressure at the location of the constriction in the water transport pipe, because it is being branched off at a position upstream of the constriction. Also the mixing device can be dimensioned such that when all the extract has been removed from the container, a last amount of water will rinse the connection pipe from the hollow space onwards so that there will be no extract remaining. Thus the system is directly ready for use for another type of drink extract. In addition this is beneficial for hygiene of the system.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 1 shows a schematic representation of important part of a mixing device according to the invention; and FIGS. 2A, 2B and 2C show a detail of placing the extract container in the hollow space of the mixing device according to the invention.

DETAILED DESCRIPTION OF THE INVENTION

In a first preferred embodiment of the invention, the first and/or the second opener comprise a piercing element. When an extract container is being placed in the hollow space and for instance while closing the hollow space the extract container is being pierced, so that the extract can flow out.

In a second preferred embodiment of the invention the first and/or the second opener comprise a pressure transfer element for transferring an underpressure or an overpressure to the extract container so that at the location of the pressure transfer element an opening is being created. This opening can be created by little valves that have been integrated in the extract container, and that are opening when an underpressure or in another example an overpressure is being applied, the valve for instance opening against an existing spring pressure. Also in that particular location in the extract container breaking/tear lines can be incorporated so that the underpressure or the overpressure creates an opening by tearing in the extract container.

In a preferred embodiment of the system according to the invention the water transport pipe comprises a controllable valve preferably near the water feed. This enables adjusting the amount of prepared drink to a desired volume, for instance in relation to the available cups or glasswork.

In another preferred embodiment of the invention the water transport pipe is being led along a cooling element and/or a heating element at least over a part of its length. This gives the possibility to cool and/or heat the water during transport and thus prepare directly a cooled or heated drink. In an embodiment that constructively can be executed rather simply the cooling element is a Peltier-element.

In yet another preferred embodiment of the system according to the invention the water transport pipe is connectable by means of a for instance controllable valve to a source of $CO_2$, e.g. a cartridge or a $CO_2$ bottle. This enables the preparation of carbonated drinks. Because the valve is controllable, also the preparation of non-carbonated drinks may be selected. This makes it possible by means of a selector switch on the mixing device to select for each glass or cup if the drink needs to be prepared with carbonated water or with just plain water.

In another preferred embodiment the system according to the invention comprises a pump for increasing the water pressure in the water transport pipe, possibly inclusive of the pressure in the water reservoir. This offers several advantages. It enhances the Venturi-effect and also the overpressure in the branch pipe. In addition the ability of the water to absorb carbon dioxide is increased by the higher pressure in the water and in the carbon dioxide.

The invention also encompasses a method for preparing a drink utilizing a system according to the invention wherein the steps of the method have been described herein. Particular advantageous embodiments of the method have also been described herein. However, the steps of the method have already to a large extend being described above.

The understanding of the system and the method according to the invention may be possibly be enhanced by an example of a preferred embodiment of a system according to the invention that is described below, with reference to the drawing in which:

FIG. 1 is a schematic representation of the most important part of an example of a preferred embodiment of a system according to the invention. The system comprises a mixing device 1 and an extract container 2. Extract container 2 is an independent unit that is closed from all sides and encloses a predefined amount of extract of a certain type of drink. Mixing device 1 comprises a water transport pipe 3 that is connected to a water feed 4 that has not being shown. This water feed can be in the form of a connection to a drink water system or may be a connection to a water reservoir that is part of the mixing device with a pump. The amount of water used for each drink is controlled via a controllable valve 14. This amount may be preset and also be adjustable. Also part of the water transport pipe 3 is a connection 15 to a source of carbon dioxide. Carbon dioxide connection 15 is connected via pipe to a carbon dioxide container 17 that by means of a magnetic valve 18 has been connected with the carbon dioxide pipe. Water transport pipe 3 runs along the cooling side of a cooling element, for instance a Peltier-element. In another embodiment of a mixing device according to the invention, the mixing device comprises in addition also a heating element and means to selectively operate the cooling element or the heating element, so that both cooled and warm drinks may be prepared. Subsequently on water transport pipe 3 a branch pipe 13 is connected that will be explained further below. Further downstream the water transport pipe 3 comprises constriction 10. During operation, when water is flowing through the transport pipe 3 from the water feed 4 to discharge opening 5, if desired using the magnetic valve 18 carbon dioxide will be added and the carbonated water will be cooled by cooling element 16. After that the flowing water will pass constriction 10 and thus due to the Venturi-effect, locally an underpressure will be established. Mixing device 1 further comprises a hollow space 7 that is best shown in FIG. 2A.

FIGS. 2A, 2B and 2C show three stages of the part of the mixing device 1 with the hollow space 7 in which extract container 2 can be placed. The placing of extract container 2 in hollow space 7 of mixing device 1 is illustrated in three steps in FIGS. 2A, 2B and 2C respectively. In FIG. 2A hollow space 7 is shown without cover 11. Extract container 2 that in this embodiment has the shape of a truncated cone with internally smooth side walls and a straight pierceable top and bottom side, is being placed in FIG. 2A in the hollow space 7. The shape of hollow space 7 is complementary to the external shape of extract container 2. During placing in the hollow space 7 the bottom of extract container 2 will be pierced by the first piercing element 8 that is mounted to the bottom side of the hollow space 7. First piercing element 8 surrounds a connection pipe 9 that connects the hollow space 7 with the water transport pipe 3 at the location of the constriction 10. In FIG. 2B is shown how the cover 11 of the hollow space 7 is being placed on top of the extract container 2. Cover 11 comprises in the middle a second piercing element 12 for piercing the top side of the extract container 2 and second piercing element 12 surrounds the end of branch pipe 13 that connects the hollow space 7 with water transport pipe 3 at a location that is upstream from the constriction 10. FIG. 2C shows extract container 2 positioned in the hollow space 7 and with cover 11 closed on top of the hollow space 7 and the extract container 2.

During operation cooled and if desired carbonated water flows through water transport pipe 3. A part of this water will arrive via the opening in the top side of the extract container 2 on top of the drink extract, via branch pipe 13. This water has higher pressure than the water at the location of the constriction 10. Pushing of the drink extract out of the extract container 2 principally take place by the underpressure that is the consequence of the Venturi-effect on the flowing water in the water transport pipe 3 at location of the restriction 10, which underpressure is also present in the bottom side of extract container 2 via connection pipe 9. The water that flows via the branch pipe 13 in the interior of the extract container 2 will also support the discharge of the drink extract from the extract container 2. The drink extract will thus be moved to constriction 10 where it enters the transport pipe 3 and in a direction perpendicular to the water flowing by. This not only sucks the drink extract from the extract container 2 but also ensures a good mixing of the extract with the water flowing by in the water transport pipe 3, thus creating a good mixing before the drink mixture flows at discharge opening 5 in a cup or glass 6 that has been placed there.

The system according to the invention is in the above example of an embodiment has been described with an extract container 2 in the shape of a truncated cone. The invention, however, is not limited to this shape but also encompasses other thinkable useful shapes, such as a sphere, other convex shapes, etc. Also collapsible extract containers can be used in a system according to the invention. Also mixing device 1 can be embodied such that extract is directly poured in the hollow space when this is in the opened condition, so that after closing a drink can be prepared with the poured extract.

With the system illustrated it is possible to prepare all kinds of different drinks simply by each time loading a new extract container in the hollow space 7 of the mixing device 1. In the example of an embodiment of the invention here described, the extract container 2 has the shape of a truncated cone, which is also known as a cup. By entering a new cup, after the previous one has been removed, each time a new drink chosen from a wide assortment can be prepared. By adjusting the system such that the extract container 2 is empty before the last water is flowing through the water transport pipe 3 and the branch pipe 13, also the connection pipe 9, downstream of the extract container 2, is being rinsed, so that this this is being cleaned and ready for the extract of possibly another drink. Also from hygiene point of view this rinsing is important, certainly in case there is a long period of time between the preparation of two drinks.

Because the system according to the invention is arranged to deliver single consumption amounts of a certain drink and because after each drink a new drink may be delivered, independent of the kind, a system has been proposed that with one mixing device consecutively a large variety of different drinks can be prepared. Because the extract container is dimensioned to a quantity for a single drink, storage and other logistic parameters of a large variety of drinks is a rather simple matter. The variety of drinks is exclusively determined by availability of the pertaining extracts. Preparation of drink extracts already since long is state of the art and is not limited to lemonades, tea, coffee and fruit juices, but is equally well applicable to a large variety of wines, beers, etc.

LIST OF REFERENCE NUMBERS

1. Mixing device
2. Extract container
3. Water transport pipe
4. Water feed
5. Discharge opening
6. Glass/cup
7. Hollow space
8. First opener/piercing element
9. Connection pipe between 7 and 3
10. Constriction of 3
11. Cover of 7
12. Second opener/piercing element
13. Branch pipe
14. Controllable valve
15. Carbon dioxide connection
16. Cooling element
17. Carbon dioxide container
18. Magnetic valve Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A system for preparing a drink by mixing a drink extract with water into a drinking mixture, wherein the system comprises a mixing device which comprises:
   a water transport pipe that at one end is connectable to a water feed and at the other end comprises a discharge opening for discharging the drinking mixture into a drinking vessel placed at the discharge opening;
   a receptacle with a hollow space in which an extract container holding a predefined amount of drink extract is received, the extract container being an independent unit closed from all sides;
   a first opener for opening of the extract container at a bottom of the extract container when placed in the hollow space; and
   a first connection that connects the hollow space to the water transport pipe;
   wherein the water transport pipe at the location of the connection with the hollow space comprises a constriction for during operation creating a local underpressure in the water transport pipe, which constriction is connected via the connection to the first opener to transfer the underpressure to the first opener and cause the extract to be sucked via the connection out of the extract container into the water transport pipe, wherein, in operation, in the water transport pipe the extract mixes with the water flowing through the water transport pipe before discharging the drinking mixture from the discharge opening.

2. The system according to claim 1, wherein the mixing device comprises a second opener for opening an extract container that has been placed in the hollow space at a top side, wherein the second opener has been coupled to a branch pipe for establishing a second connection between the water transport pipe at a position upstream of the constriction and the opened top side of the extract container.

3. The system according to claim 2, wherein at least one of the opener and the second opener comprises a piercing element.

4. The system according to claim 2, wherein at least one of the first opener and the second opener comprises a pressure transfer element.

5. The system according to claim 1, wherein the water transport pipe near the water feed comprises a controllable valve.

6. The system according to claim 1, wherein the water transport pipe runs along a cooling element and/or along a heating element for at least part of its length.

7. The system according to claim 1, wherein the water transport pipe is connectable by means of controllable valve to a source of $CO_2$.

8. The system according to claim 1, wherein the extract container has the shape of a truncated cone.

9. The system according to claim 1, wherein the water feed comprises an external drink water system to which the water transport pipe is connectable.

10. The system according to claim 1, wherein the water transport pipe comprises a water reservoir.

11. The system according to claim 1, wherein the water transport pipe comprises a pump for increasing the water pressure.

12. The system according to claim 2, wherein:
   when the water flows through the water transport pipe then also the water will flow through the branch pipe to the extract container and push the drink extract from the top of the extract container, and
   when all the extract has been removed from the extract container, a last amount of water from the branch pipe will rinse the first connection.

13. An extract container holding a predefined amount of drink extract usable in a system as claimed in any one of claims 1-11, which the extract container is an independent unit closed from all sides which is received in the hollow space of the system and has a bottom which can be opened by the first opener of the system.

* * * * *